July 22, 1924.

J. O. McPHERSON

SPIKE PULLER

Filed Dec. 21, 1923

1,502,391

Inventor
J. O. McPherson
By D. Swift
Attorney

Patented July 22, 1924.

1,502,391

UNITED STATES PATENT OFFICE.

JOHN O. McPHERSON, OF RENTON, WASHINGTON.

SPIKE PULLER.

Application filed December 21, 1923. Serial No. 682,015.

*To all whom it may concern:*

Be it known that I, JOHN O. McPHERSON, a citizen of the United States, residing at Renton, in the county of King, State of Washington, have invented a new and useful Spike Puller; and I do hereby declare the following to be a full, clear, and exact description of the invention, such as will enable others skilled in the art to which it appertains to make and use the same.

The invention relates to spike pullers, and has for its object to provide a device of this character whereby spikes may be easily and positively pulled, even though the heads are off the spikes.

A further object is to provide a spike puller comprising a disc shaped member having a tangential handle, which disc shaped member is centrally pivoted in a foot member and is provided with a pivoted U-shaped jaw pivoted to the disc to one side of the center thereof and provided with a toothed spike engaging wheel spaced from teeth of the disc and disposed in the plane of the disc and adapted in combination with the disc to grasp and hold a spike during a spike pulling operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
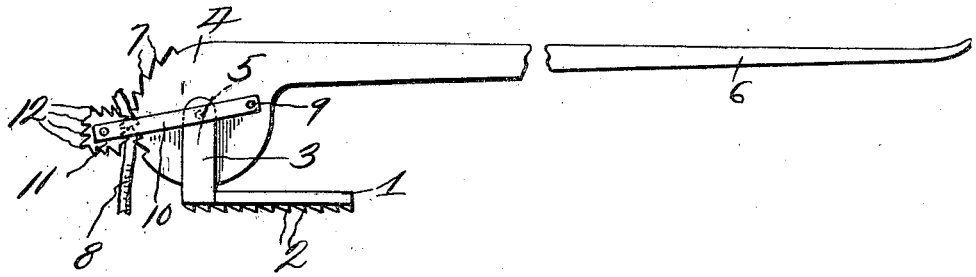
Figure 1 is a side elevation of the spike puller.
Figure 2:
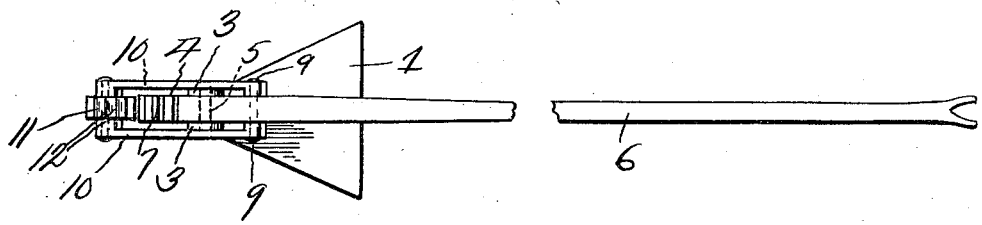
Figure 2 is a top plan view of the spike puller.
Figure 3:
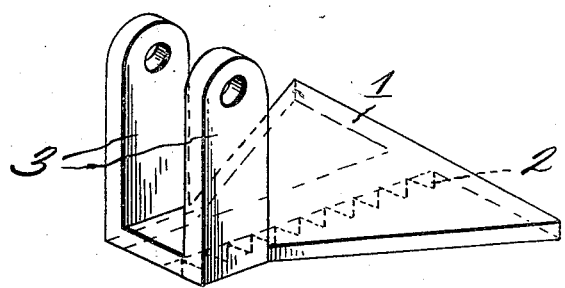
Figure 3 is a perspective view of the foot member of the spike puller.

Referring to the drawing, the numeral 1 designates the base of the device, which base has its under side provided with a plurality of teeth 2 adapted to be imbedded in a tie or the like while pulling a spike, at which time the operator places his foot on the base 1. The forward end of the base 1 is provided with upwardly extending spaced arms 3, and to the upper ends of which the disc 4 is pivotally connected at 5, whereby said disc may be rotated upon a downward movement of the tangentially disposed handle member 6 during a spike pulling operation. The periphery of the disc 4 is provided with a plurality of upwardly extending teeth, which teeth, during the downward movement of the handle member 6, bite into the spike 8, thereby insuring a positive gripping of the spike. Pivotally connected at 9 to opposite sides of the disc 4 and rearwardly of the pivotal point 5 are forwardly extending arms 10, which arms extend beyond the forward side of the disc 4 and having pivotally mounted therebetween a toothed wheel 11, which wheel has its teeth 12 rectangularly arranged whereby the teeth which grip the outer side of the spike 8 are in the same plane and consequently a wide gripping surface is provided. It will be seen that when the disc 4 is rocked while in position shown in Figure 1, in which position the spike 8 is positively held, the spike will be pulled, and the spike, even though the head is off the same, will be easily pulled.

The device is shown in Figure 1 in operative position, however when applying the device to a spike the handle member 6 is raised as well as the arms 10, thereby allowing the spike to be inserted between the disc 4 and the toothed wheel 11, and the higher the arms 10 and the handle 6 are raised, the greater the distance between the disc 4 and the toothed wheel 1, consequently a relatively large spike or bolt may be gripped. This increasing distance between the disc 4 and the toothed wheel 11 is caused by the pivoting of the arms 10 to the rear side of the pivotal point 5 of the disc, consequently an eccentric movement is obtained.

From the above it will be seen that a spike pulling device is provided which will grip and hold spikes of different diameters and will positively extract the same with a minimum amount of power.

The invention having been set forth what is claimed as new and useful is:—

1. A spike pulling device comprising a base, upwardly extending spaced arms at the forward end of said base, a disc pivotally mounted between the arms, a tangential handle member carried by said disc, a plurality of concentrically arranged teeth carried by the periphery of the disc at its forward side, arms pivoted to the disc at opposite sides thereof and rearwardly of the pivotal point of the disc and disposed outside of the upwardly extending spaced arm, said pivoted arms extending forwardly of the disc, and a toothed wheel pivotally mounted between the pivoted arms forwardly of the disc.

2. A spike pulling device comprising a base, a disc pivotally mounted on the base, concentrically arranged teeth carried by said disc and extending upwardly, a handle member carried by said disc, arms pivoted to said disc at opposite sides thereof and extending beyond the forward side of the disc and a toothed wheel pivotally mounted between the arms beyond the forward side of the disc.

3. A spike pulling device, said device comprising a base, a pivoted toothed disc, carried by said base, a handle member carried by the disc, a toothed wheel adjacent the disc and in the same plane as the disc, arms pivoted to the disc to one side of the pivotal point of the disc, said toothed wheel being pivotally mounted between said arms.

In testimony whereof I have signed my name to this specification in the presence of two subscribing witnesses.

JOHN O. McPHERSON.

Witnesses:
ALFRED C. WILSON,
J. E. MAELONE.